(12) United States Patent
Nishina et al.

(10) Patent No.: US 10,888,995 B2
(45) Date of Patent: Jan. 12, 2021

(54) GRIPPING METHOD, GRIPPING SYSTEM, AND PROGRAM

(71) Applicant: OMRON Corporation, Kyoto (JP)

(72) Inventors: Yuki Nishina, Ikoma (JP); Yoshinori Konishi, Souraku-gun (JP)

(73) Assignee: OMRON Corporation, Kyoto (JP)

( * ) Notice: Subject to any disclaimer, the term of this patent is extended or adjusted under 35 U.S.C. 154(b) by 310 days.

(21) Appl. No.: 16/130,304

(22) Filed: Sep. 13, 2018

(65) Prior Publication Data

US 2019/0143507 A1 May 16, 2019

(30) Foreign Application Priority Data

Nov. 14, 2017 (JP) ................................. 2017-218956

(51) Int. Cl.
| | | |
|---|---|---|
| *G06F 17/00* | (2019.01) | |
| *B25J 9/16* | (2006.01) | |
| *G06K 9/00* | (2006.01) | |
| *G06K 9/32* | (2006.01) | |
| *B25J 13/08* | (2006.01) | |

(52) U.S. Cl.
CPC .......... *B25J 9/1612* (2013.01); *B25J 9/1669* (2013.01); *B25J 9/1697* (2013.01); *B25J 13/089* (2013.01); *G06K 9/00201* (2013.01); *G06K 9/3241* (2013.01); *G05B 2219/39543* (2013.01); *G05B 2219/40053* (2013.01)

(58) Field of Classification Search
CPC ...... B25J 9/1612; B25J 9/1669; B25J 9/1697; B25J 13/089; G06K 9/00201; G06K 9/3241; G05B 2219/39543; G05B 2219/40053

USPC ......................................................... 700/245
See application file for complete search history.

(56) References Cited

U.S. PATENT DOCUMENTS 7,313,464 B1  12/2007  Perreault et al.
8,260,458 B2 *  9/2012  Kim ...................... B25J 9/1612
                                                      700/245

(Continued)

FOREIGN PATENT DOCUMENTS

JP        5558585 B2      7/2014
WO    2012/056520 A1     5/2012

OTHER PUBLICATIONS

The extended European search report dated Mar. 15, 2019 in a counterpart European patent application.

*Primary Examiner* — Ronnie M Mancho
(74) *Attorney, Agent, or Firm* — Metrolex IP Law Group, PLLC

(57) ABSTRACT

A gripping method relates to a gripping method for gripping an object using a multi-fingered hand provided with a plurality of fingers. A three-dimensional measurement sensor is used to measure an area that contains the object to obtain three-dimensional information. If the area includes an area for which no three-dimensional information can be obtained, the area is separated and is interpolated using the range information indicating the closer one of distances obtained at two positions on an axis extending along a direction in which the fingers are opened and closed, the two positions being adjacent to the unmeasured area with the unmeasured area interposed therebetween. Then, the distance between the fingers for gripping the object is decided, and the multi-fingered hand is controlled based on the distance.

19 Claims, 10 Drawing Sheets

(56) References Cited

U.S. PATENT DOCUMENTS

| | | | |
|---|---|---|---|
| 8,463,434 B2* | 6/2013 | Takahashi | B25J 15/0009 |
| | | | 700/245 |
| 8,543,240 B2* | 9/2013 | Itkowitz | A61B 34/74 |
| | | | 700/258 |
| 8,733,810 B2* | 5/2014 | Oda | B25J 15/083 |
| | | | 294/86.4 |
| 8,935,003 B2* | 1/2015 | Itkowitz | A61B 34/30 |
| | | | 700/245 |
| 9,144,908 B2* | 9/2015 | Saen | B25J 13/085 |
| 9,149,928 B2* | 10/2015 | Yamaguchi | B25J 9/0093 |
| 9,333,648 B2* | 5/2016 | Kim | B25J 9/1612 |
| 10,071,485 B2* | 9/2018 | Schiele | G05G 1/04 |
| 2004/0122552 A1 | 6/2004 | Ban et al. | |
| 2006/0142896 A1* | 6/2006 | Yokoyama | B25J 13/082 |
| | | | 700/245 |
| 2007/0219668 A1* | 9/2007 | Takahashi | B25J 9/1612 |
| | | | 700/249 |
| 2010/0292837 A1* | 11/2010 | Takahashi | B25J 9/1612 |
| | | | 700/245 |
| 2013/0173055 A1* | 7/2013 | Kim | B25J 3/04 |
| | | | 700/245 |
| 2013/0211593 A1 | 8/2013 | Domae et al. | |
| 2015/0003678 A1 | 1/2015 | Watanabe et al. | |

\* cited by examiner

GRIPPING METHOD, GRIPPING SYSTEM, AND PROGRAM

CROSS-REFERENCES TO RELATED APPLICATIONS

This application claims priority to Japanese Patent Application No. 2017-218956 filed Nov. 14, 2017, the entire contents of which are incorporated herein by reference.

FIELD

The disclosure relates to a gripping method, a gripping system, and a program.

BACKGROUND

As a method for gripping a workpiece using a multi-fingered hand, JP5558585B discloses a workpiece pick-up method in which the gripping position/posture is derived based on workpiece measurement data obtained by three-dimensionally measuring a workpiece and hand shape data for gripping the workpiece.

JP5558585B describes, as a unit for obtaining the three-dimensional workpiece measurement data, for example, a twin-lens or multiple-lens stereo camera, a stereo camera of the active stereo measurement method that is provided with a light projecting unit such as a laser or a projector and a camera, or the like.

JP5558585B is an example of background art.

SUMMARY

In a stereo measurement method as described above, it is generally known that there are areas for which no three-dimensional workpiece measurement data can be obtained due to occlusion. Furthermore, it is also known that, in addition to such areas caused due to occlusion, there are areas for which no three-dimensional workpiece measurement data can be obtained depending on the state of the surface of a workpiece to be measured. In this case, even if a user tries to derive the gripping position/posture based on workpiece measurement data and hand shape data for gripping workpieces, he or she cannot derive the gripping position/posture for a workpiece located near the area for which no measurement data can be obtained, and thus cannot grip the workpiece.

Accordingly, one or more aspects may provide a gripping method, a gripping system, and a program by which an object can be gripped even if an area that contains the object includes an area for which no three-dimensional measurement information can be obtained.

According to one aspect, provided is a gripping method for gripping an object using a multi-fingered hand provided with a plurality of fingers.

The method includes: a range information obtaining step of obtaining, using a three-dimensional measurement sensor, three-dimensional information that includes range information for a predetermined area that contains the object; an interpolating step of classifying, if the predetermined area includes an area for which the three-dimensional information cannot be obtained, the predetermined area into a measured area and at least one unmeasured area based on the three-dimensional information, and interpolating the at least one unmeasured area using the range information indicating the closer one of distances obtained at two positions on an axis extending along a direction in which the fingers are opened and closed, the two positions being adjacent to the unmeasured area with the unmeasured area interposed therebetween; a distance deciding step of deciding a distance between the plurality of fingers based on the range information obtained in the range information obtaining step and the range information obtained through the interpolation in the interpolating step; and a step of controlling the multi-fingered hand to grip the object with the decided distance between the fingers.

According to this method, if there is an unmeasured area for which no three-dimensional information can be obtained, the unmeasured area will be interpolated using the range information indicating the closer distance, and thus, even if there is such an area, it is possible to grip an object by defining range information for all of the positions within the area containing the object, and deriving the gripping position/posture.

Furthermore, in the distance deciding step, a distance between the fingers at which they do not interfere with the object may be decided as the distance between the plurality of fingers, based on the range information obtained in the range information obtaining step and the range information obtained through the interpolation in the interpolating step.

According to this method, even if the area that contains an object includes an area for which no three-dimensional measurement information can be obtained, it is possible to decide the distance between the fingers so that the object is not damaged.

The method further includes: a second interpolating step of interpolating the at least one unmeasured area using the range information indicating the farther one of the distances obtained at the two positions adjacent to the unmeasured area; and a gripping position deciding step of deciding positions of the plurality of fingers when the plurality of fingers grips the object, based on the range information obtained in the range information obtaining step and the range information obtained through the interpolation in the second interpolating step.

According to this method, since the range information obtained through the interpolation in the second interpolating step in which interpolation is performed using the range information indicating the farther distance is used to decide the positions of the fingers when gripping the object, it is possible to appropriately decide the gripping position by extracting edges of an object.

Furthermore, in the gripping position deciding step, in the gripping position deciding step, the positions of the plurality of fingers when the plurality of fingers grips the object can be decided, based on data indicating a shape of the object, data indicating a shape of the plurality of fingers, and data indicating positions at which the object can be gripped.

According to this method, since data indicating a shape of the object, data indicating a shape of the plurality of fingers, and data indicating positions at which the object can be gripped are used, it is possible to more accurately decide the positions of the fingers when gripping.

Furthermore, in the interpolating step, if any of operation areas of the fingers that include the positions of the fingers decided in the gripping position deciding step contain one unmeasured area and two measured areas separated by the unmeasured area, the unmeasured area may be interpolated using the range information indicating the closer one of distances represented by range information at a first position in the operation area at which one of the measured areas is adjacent to the unmeasured area, and range information at a second position in the operation area at which the other one of the measured areas is adjacent to the unmeasured area.

According to this method, if the operation area of the fingers that includes the positions of the fingers contains one unmeasured area and two measured areas separated by the unmeasured area, the unmeasured area is interpolated using the range information indicating the closer distance, and thus it is possible to grip an object even if the object is present in the unmeasured area.

Furthermore, the method may further include a multi-fingered hand moving step of advancing the multi-fingered hand toward the object while keeping the distance between the plurality of fingers decided in the distance deciding step; and a gripping step of gripping the object by moving the plurality of fingers to the positions of the plurality of fingers decided in the gripping position deciding step while changing the distance between the plurality of fingers.

According to this method, since the multi-fingered hand moving step of advancing the multi-fingered hand toward the object while keeping the decided distance between the plurality of fingers is included, the object is not damaged when the multi-fingered hand is advancing.

Note that the expression "advancing the multi-fingered hand toward the object while keeping the distance between the plurality of fingers" encompasses a case where the multi-fingered hand is advanced toward the object while keeping the distance between the fingers at least in the vicinity of the object.

Furthermore, in the gripping step, the plurality of fingers may be moved so that the distance between the plurality of fingers is reduced.

According to this method, by reducing the distance between the plurality of fingers, it is possible to grip the outer edge of the object.

Furthermore, in the gripping step, any one of the plurality of fingers may get into contact with the object after having moved from the measured area to the unmeasured area.

According to this method, since any one of the plurality of fingers is moved from the measured area to the unmeasured area, it is possible to grip an object even if the object is present in the unmeasured area.

Furthermore, the distance deciding step may include: a step of determining whether or not any of the plurality of fingers interfere with the object if the distance between the plurality of fingers is a first distance, based on the range information obtained in the range information obtaining step and the range information obtained through the interpolation in the interpolating step; and a step of searching for, if it is determined in the previous step that any of the plurality of fingers interfere with the object, a second distance at which the plurality of fingers do not interfere with the object, the second distance serving as the distance between the plurality of fingers.

According to this method, if it is determined that any of the plurality of fingers interfere with the object when the distance between the plurality of fingers is the first distance, the second distance, serving as the distance between the plurality of fingers, at which the plurality of fingers do not interfere with the object is searched for, and thus it is possible to decide an appropriate distance between the fingers.

According to another aspect, a gripping system includes a multi-fingered hand provided with a plurality of fingers for gripping an object; a robot arm to which the multi-fingered hand is connected; a three-dimensional measurement sensor configured to obtain three-dimensional information that includes range information for a predetermined area that contains the object; and a controller configured to classify, if the predetermined area includes an area for which the three-dimensional information cannot be obtained, the predetermined area into a measured area and at least one unmeasured area based on the three-dimensional information, and interpolate the at least one unmeasured area using the range information indicating the closer one of distances obtained at two positions on an axis extending along a direction in which the fingers are opened and closed, the two positions being adjacent to the unmeasured area with the unmeasured area interposed therebetween, the controller being configured to decide a distance between the plurality of fingers based on the range information obtained by the three-dimensional measurement sensor and the interpolated range information, and the controller being configured to control the multi-fingered hand to grip the object with the decided distance between the fingers.

According to this gripping system, if there is an unmeasured area for which no three-dimensional information can be obtained, the unmeasured area will be interpolated using the range information indicating the closer one of distances obtained at two adjacent positions, and thus, even if there is such an area, it is possible to grip an object by defining range information for all of the positions within the area containing the object, and deriving the gripping position/posture.

According to yet another aspect, provided is a program for gripping an object using a multi-fingered hand provided with a plurality of fingers. The program causes a computer to execute a range information obtaining step of obtaining, using a three-dimensional measurement sensor, three-dimensional information that includes range information for a predetermined area that contains the object; an interpolating step of classifying, if the predetermined area includes an area for which the three-dimensional information cannot be obtained, the predetermined area into a measured area and at least one unmeasured area based on the three-dimensional information, and interpolating the at least one unmeasured area using the range information indicating the closer one of distances obtained at two positions on an axis extending along a direction in which the fingers are opened and closed, the two positions being adjacent to the unmeasured area with the unmeasured area interposed therebetween, a distance deciding step of deciding a distance between the plurality of fingers based on the range information obtained in the range information obtaining step and the range information obtained through the interpolation in the interpolating step; and a step of controlling the multi-fingered hand to grip the object with the decided distance between the fingers.

According to this program, if there is an unmeasured area for which no three-dimensional information can be obtained, the unmeasured area will be interpolated using the range information indicating the closer one of distances obtained at two adjacent positions, and thus, even if there is such an area, it is possible to grip an object by defining range information for all of the positions within the area containing the object, and deriving the gripping position/posture.

According to one or more aspects, it is possible to provide a gripping method, a gripping system, and a program by which an object can be gripped even if an area that contains the object includes an area for which three-dimensional measurement information cannot be obtained.

DETAILED DESCRIPTION

First Embodiment

First, an example of an embodiment to which one or more aspects are implemented will be described with reference to FIG. 1.

Figure 1:
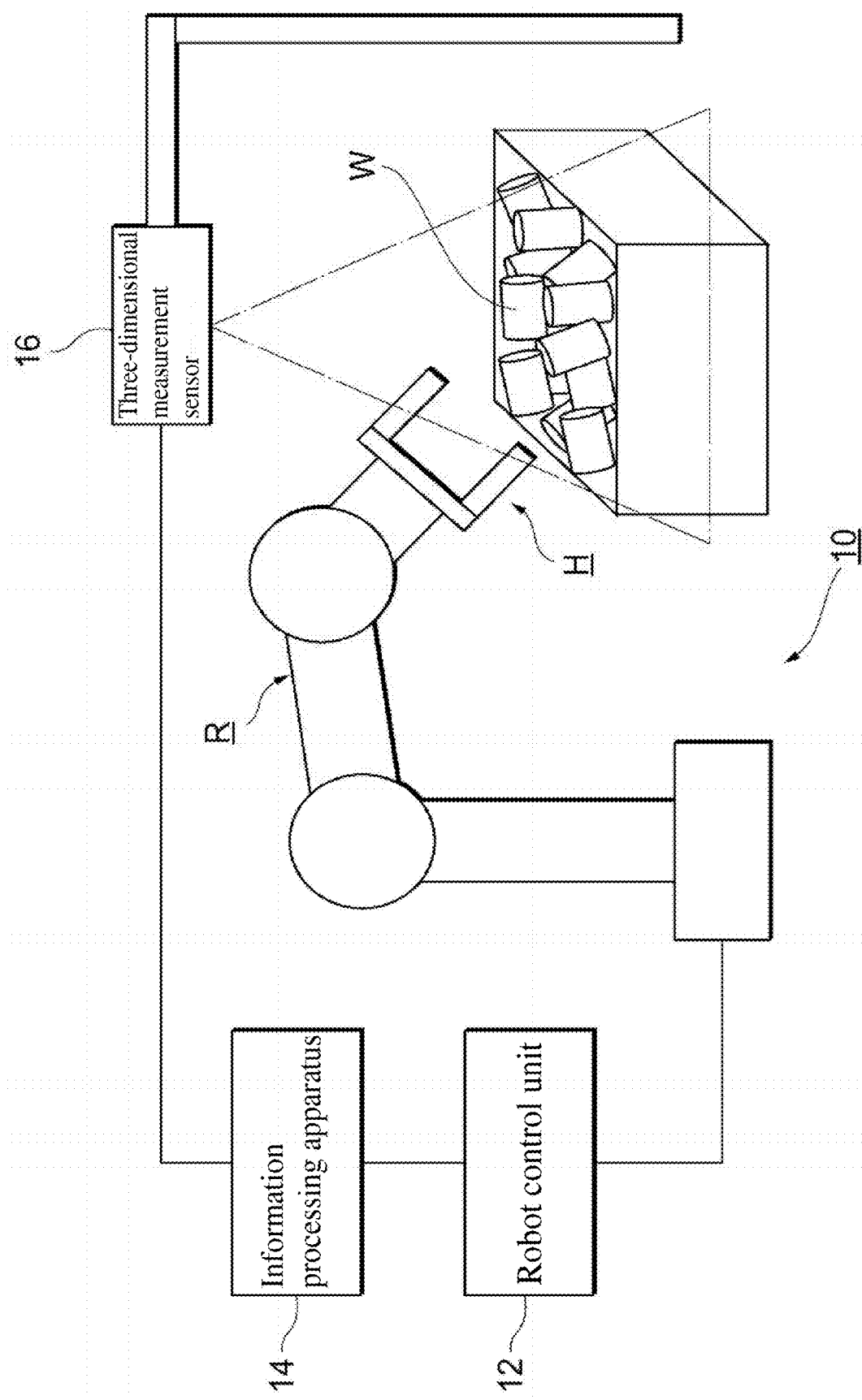
FIG. 1 is a diagram illustrating a gripping system according to one or more embodiments.

FIG. 1 is a diagram illustrating a hardware configuration of a gripping system 10 (an example of a "gripping system") according to one or more embodiments. As an example of a case to which one or more aspects are applied, a gripping method will be described that is performed when a workpiece W (an example of an "object") is gripped using a robot R with a robot arm to which a multi-fingered hand H is connected.

First, a three-dimensional measurement sensor 16 (an example of a "three-dimensional measurement sensor") is used to measure an area that contains a workpiece W, and obtain, for each position within the area, three-dimensional information that includes range data (an example of "range information").

Here, there are cases where unmeasured areas UA for which no range data can be obtained (an example of "unmeasured areas") may occur due to various reasons. For example, an area for which it is difficult to obtain range data is typically present in the vicinity of edges of workpieces W.

If such an unmeasured area UA has occurred, range data of the unmeasured area UA is interpolated using range data of adjacent areas (an example of "measured areas") for which three-dimensional information could be obtained. At this time, the interpolation is performed using the closer one of the distances represented by the range data that correspond to two adjacent positions.

If, for example, an unmeasured area UA is present in the vicinity of the edge of a workpiece W placed on a table, the unmeasured area UA is interpolated using the range data of the workpiece W because the workpiece W is closer to the sensor than the table. Accordingly, the unmeasured area UA is dealt with as if it is an area in which the workpiece W is present.

Then, the distance between the fingers of the multi-fingered hand H is decided using the interpolated three-dimensional information. As a result of using the interpolated three-dimensional information, it is possible to grip the workpiece W without damaging it, even if it is present in an unmeasured area UA.

Note that the number of fingers of the multi-fingered hand H is not limited as long as the multi-fingered hand H has a plurality of fingers. For example, the multi-fingered hand H may have three fingers or more.

Furthermore, the concept "deciding the distance between the fingers" encompasses "directly or indirectly deciding information that indicates the distance between the fingers". For example, if the distance between the fingers of the multi-fingered hand H varies based on certain information, deciding such information is included in this concept.

Furthermore, the gripping method of one or more embodiments is applicable to not only a multi-fingered hand H of the so-called outer diameter gripping type that grips a workpiece W by moving the fingers so that the distance between the fingers is reduced, but also a multi-fingered hand H of the so-called inner diameter gripping type that grips a workpiece W by moving the fingers so that the distance between the fingers is increased.

Furthermore, it is not always necessary to interpolate the entire unmeasured area UA. The interpolation may be performed only on areas in the operation directions of the fingers of the multi-fingered hand H when gripping a workpiece W. For example, if the fingers of the multi-fingered hand H move one-dimensionally to get into contact with the workpiece W, only range data of the operation regions of the fingers, that is, unmeasured areas UA on cross sections taken along the motion directions of the fingers may be interpolated.

Furthermore, it is not always necessary to interpolate all of the unmeasured areas UA. The interpolation may be performed on only unmeasured areas UA needed for the fingers to grip the workpiece W (for example, unmeasured areas UA in the vicinity of the edge of the workpiece W) but not the remaining unmeasured areas UA (such as any small unmeasured areas UA that can be ignored and any unmeasured areas UA located at a position far away from the workpiece W).

Second Embodiment

The following will describe a second embodiment with reference to the drawings. Note that the same reference numerals are given to the same elements, and redundant descriptions will be omitted or simplified.

Figure 2:
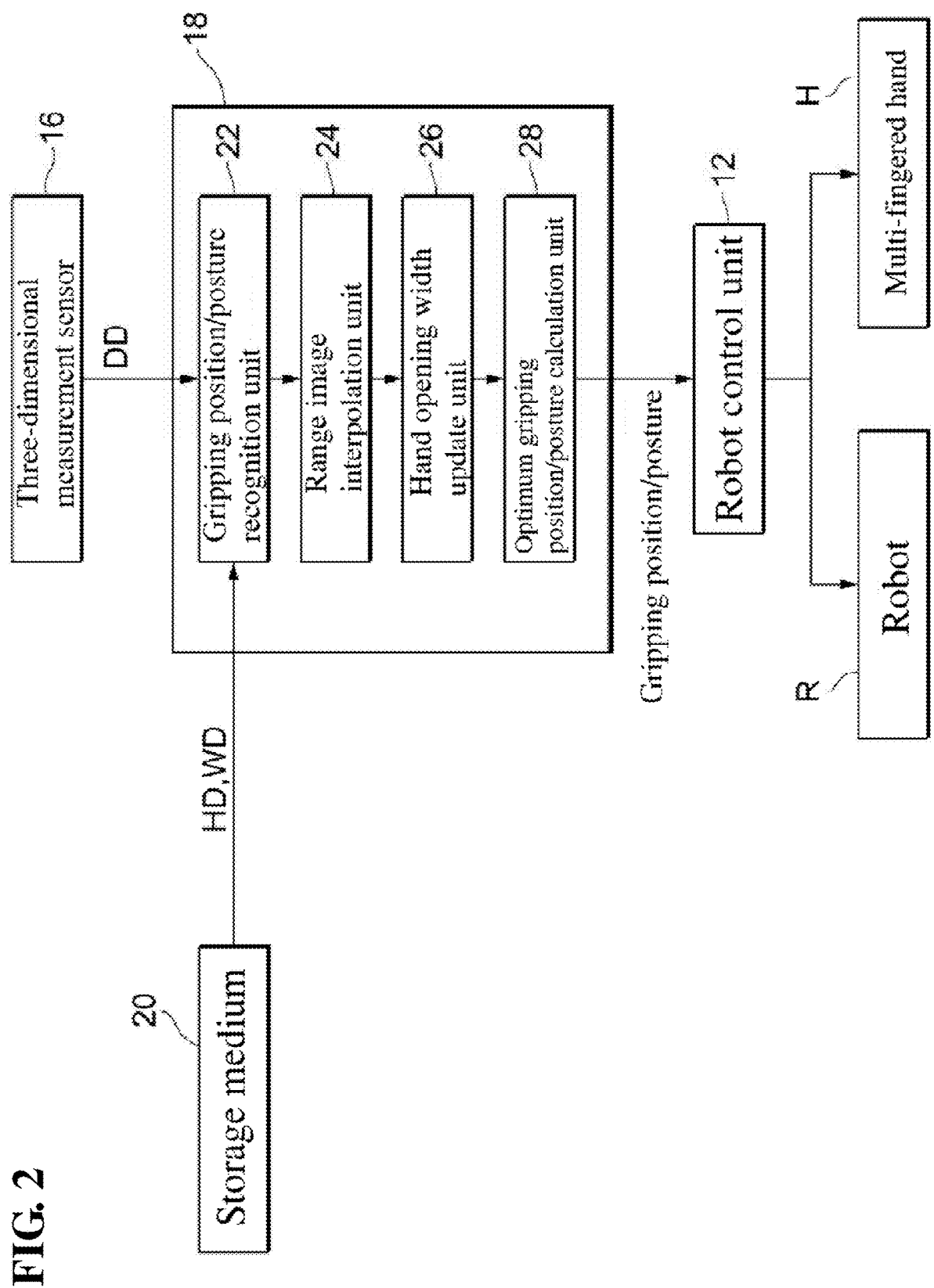
FIG. 2 is a functional block diagram illustrating a gripping system according to one or more embodiments.

FIG. 1 is a diagram illustrating a hardware configuration of a gripping system 10 according to one or more embodiments. Also, FIG. 2 is a functional block diagram of the gripping system 10.

The gripping system 10 includes a robot R. The robot R is a multi-axis and multi-joint robot arm, and is provided with a base fixed to the floor surface, a plurality of joints each functioning as a movable shaft, a plurality of links that are rotated in accordance with the movable shafts of the joints, and a servomotor for rotating the links. Furthermore, a multi-fingered hand H (an example of a "multi-fingered hand") with two fingers is coupled to the link at the distal end. Each of the fingers of the multi-fingered hand H is configured to be movable one-dimensionally (in one degree of freedom), and the distance between the two fingers can be changed in accordance with an instruction received from a robot control unit 12.

The robot control unit 12 generates control instructions to control the robot R and the multi-fingered hand H based on information for designating the gripping position/posture that is received from an information processing apparatus 14, and outputs the generated control instructions to the robot R and the multi-fingered hand H.

A three-dimensional measurement sensor 16 (an example of the "three-dimensional measurement sensor") captures an image of an area that contains a workpiece W (an example of the "object"), which is an object to be gripped, and outputs, for each image element (also referred to as "pixel"), range data representing the distance between the three-dimensional measurement sensor 16 and the object present in the area. Here, a set of the range data (an example of "range information") that are output for the image elements from the three-dimensional measurement sensor 16 (including information relating to an image element for which no range data could be obtained) is referred to as "range image data DD" (an example of "three-dimensional information").

The three-dimensional measurement sensor 16 may be of any type as long as it can obtain information indicating the distance from a reference position for a plurality of positions within a predetermined area. The three-dimensional measurement sensor 16 may be, for example, a sensor of the TOF (Time Of Flight) type that emits a laser and obtains the range based on, for example, the received time or phase of reflected light thereof, a sensor of the pattern irradiation type that emits a laser beam with a predetermined pattern, and performs range measurement based on the pattern of reflected light thereof, a sensor with a laser range finder that emits an infrared laser and performs range measurement based on reflected light thereof, or a sensor with a stereo camera that uses a twin-lens or multiple-lens camera to measure the range.

Furthermore, the three-dimensional measurement sensor 16 may be fixed above the workpiece W or may be fixed to the link at the distal end of the robot R, or the like.

For the information processing apparatus 14, it is possible to employ, for example, a general-purpose personal computer as hardware. The information processing apparatus 14 is constituted by an information processing unit 18 (an example of a "controller") that is provided with a not-shown processor for executing various types of arithmetic processing shown in one or more embodiments, a temporary storage device, and an interface, and a storage medium 20 for storing hand shape data HD of the multi-fingered hand H, workpiece shape data WD of the workpiece W, computer-readable programs for realizing types of processing shown in one or more embodiments, and the like.

The processor of the information processing unit 18 reads out a program (including a program for defining arithmetic processing indicated by the flowcharts of the present disclosure, or the like) stored in the storage medium 20, or externally acquires a program using the interface, and executes the program. The temporary storage device is constituted by a SRAM (Static Random Access Memory) or the like, and temporarily stores some of the programs, calculated data, and the like.

The storage medium 20 is a medium for storing, in a computer readable manner, information such as a program, electrically, magnetically, optically, mechanically, chemically, or in a combined manner, and includes, for example, a CD, a DVD, a magnetic disc, a MO, a semiconductor memory (a NOR flash memory, a NAND flash memory, an MRAM, and the like).

As shown in in the functional block diagram of FIG. 2, the information processing unit 18 is provided with a gripping position/posture recognition unit 22, a range image interpolation unit 24, a hand opening width update unit 26, and an optimum gripping position/posture calculation unit 28.

The gripping position/posture recognition unit 22 recognizes the gripping position/posture at which the fingers of the multi-fingered hand H are in contact with and grips a workpiece W based on the range image data DD, and the hand shape data HD and the workpiece shape data WD that are read out from the storage medium 20.

The range image interpolation unit 24 interpolates range information of an unmeasured area UA to generate the interpolated range image data DD.

The hand opening width update unit 26 updates the set value of the opening width of the multi-fingered hand H based on the range image data DD interpolated by the range image interpolation unit 24.

The optimum gripping position/posture calculation unit 28 calculates, as an optimum gripping position/posture, the gripping position/posture set by the gripping position/posture recognition unit 22 and the opening width of the multi-fingered hand H set by the hand opening width update unit 26.

Note that the temporary storage device (not shown) of the information processing unit 18 is used to temporarily store various types of data received from the three-dimensional measurement sensor 16 and the storage medium 20, data that is subjected to arithmetic processing in the blocks 22 to 28, and the like.

Figure 3:
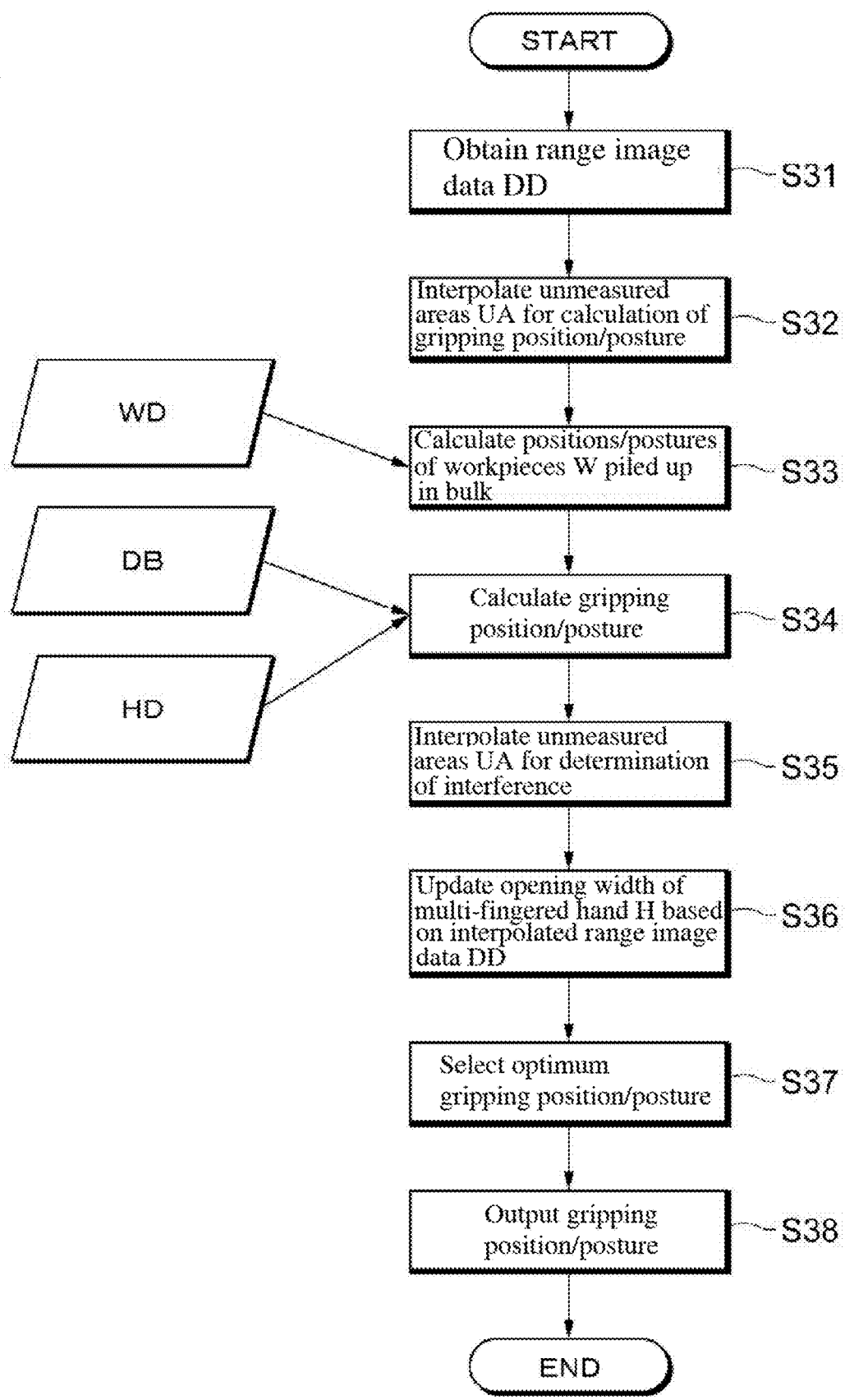
FIG. 3 is a flowchart illustrating a gripping method according to one or more embodiments.

The following will describe the gripping method according to one or more embodiments with reference to FIG. 3. FIG. 3 is a flowchart of the gripping method according to one or more embodiments.

Note that, in one or more embodiments, workpieces W, which are objects to be gripped, are components having a predetermined three-dimensional shape or objects having the same basic three-dimensional shape but having individual differences (for example, fishes, fruits, or food of the same type). The three-dimensional workpiece shape data WD of the workpieces W is stored in advance in the storage medium 20.

Furthermore, the gripping system 10 selects one of a plurality of workpieces W freely piled up in bulk (unordered) and grips the selected workpiece W. Note however that the present invention is not limited to this, and the gripping system 10 may also grip workpieces W conveyed, for example, on a belt conveyor in order.

First, the three-dimensional measurement sensor 16 captures an image of an area that contains at least one workpiece W and obtains range image data DD (step S31). The range image data DD can be displayed on a not-shown display apparatus as a two-dimensional image in which portions are displayed brighter, the closer they are to the viewer.

Here, there may be a case where range data cannot be obtained for some image elements. For example, if a significant amount of reflected light cannot be obtained due to occlusion resulting from the dead corner of the stereo camera, or the normal of the object surface having an angle almost perpendicular to the normal of the imaging area of the sensor, range data cannot be obtained. Furthermore, also if an image of a low-reflection object or conversely a specular reflection object is captured, range data cannot be obtained. The range image data DD also includes information relating to an image element for which no range data cannot be obtained for such a reason.

Figure 4:
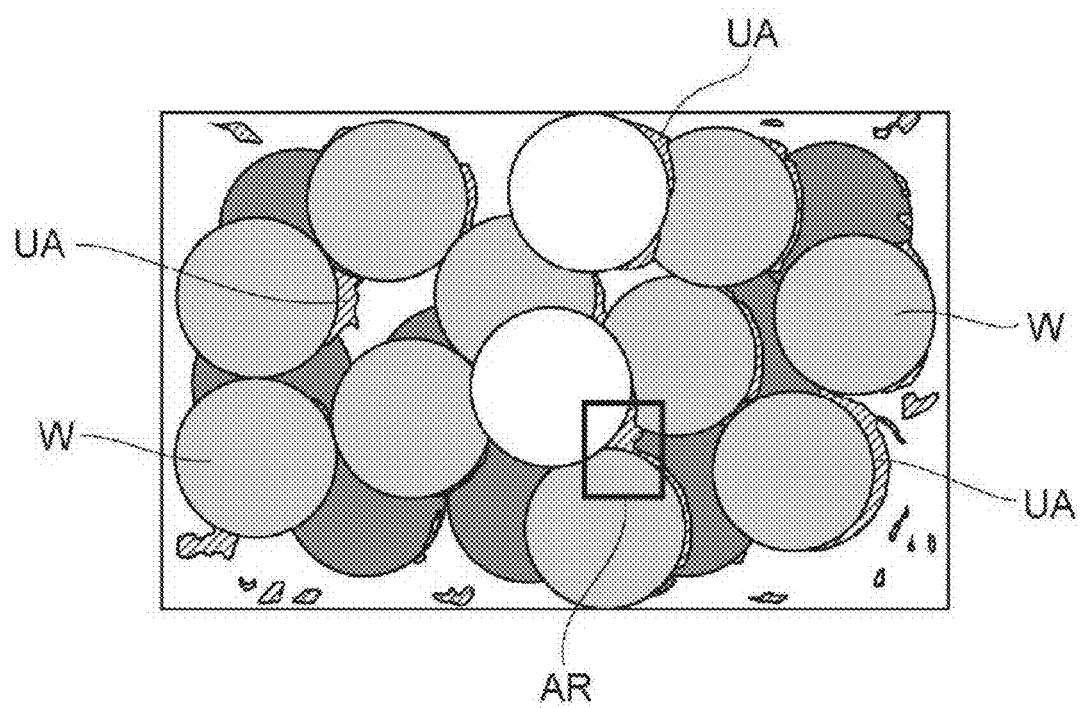
FIG. 4 is a diagram illustrating range image data obtained by capturing an image of a plurality of workpieces that are piled up in bulk.

FIG. 4 is an example showing range image data obtained by capturing an image of a plurality of workpieces W (fruits, oranges) piled up in bulk as a two-dimensional image in which the workpieces W are brighter, the closer they are to a viewer. In the case of this example, unmeasured areas UA for which no range data can be obtained due to occlusion or the like are included in the vicinities of the right edges of the plurality of workpieces W.

Then, the gripping position/posture recognition unit 22 interpolates the range data of the unmeasured areas UA (step S32). This step is a step of interpolating the range data of the unmeasured areas UA in order to perform pattern matching between the range image data DD and the workpiece shape data WD when calculating the positions and postures of the workpieces W (step S33), and can employ various known interpolation methods. Furthermore, the method of interpolating unmeasured areas UA of this step may be different from the method of interpolating unmeasured areas UA in subsequent step S35.

Then, the gripping position/posture recognition unit 22 reads out the workpiece shape data WD from the storage medium 20, extracts a plurality of workpieces W present in the range image data DD based on the workpiece shape data WD and the range image data DD in which the range data of the unmeasured areas UA has been interpolated in step S32, and calculates the positions and postures of the workpieces W (step S33). This step may be executed using, for example, a known method based on three-dimensional shape characteristics, or a method based on two-dimensional projection.

The gripping position/posture of the multi-fingered hand H for gripping a workpiece W is calculated as will be described below (step S34). First, the gripping position/posture recognition unit 22 obtains, from a gripping position database DB, grip-position information specifying the position at which a workpiece W can be gripped. The grip-position information is information specifying the position at which a given workpiece W can be gripped using a teaching pendant, a gripping simulator, or the like. The grip-position information may include a plurality of grippable positions with respect to one workpiece W. Furthermore, score information associated with each grippable position may also be included. Here, the grip-position information refers to information that includes, in a case of a multi-fingered hand H with two fingers, a pair of two grippable positions.

Furthermore, the gripping position/posture recognition unit 22 reads out the hand shape data HD from the storage medium 20. Then, the gripping position/posture recognition unit 22 calculates the gripping positions/postures of the fingers of the multi-fingered hand H for getting in contact with and gripping a workpiece W, based on the information relating to the positions/postures of the workpieces W extracted in step S33, and the grip-position information and the hand shape data HD that have been read out from the gripping position database DB. Here, it is also determined whether or not any obstacle around the workpiece W or a container that accommodates the workpiece W does not interfere with the multi-fingered hand H, and the gripping positions/postures at which the interference may occur are took out from the gripping position/posture. The gripping position/posture thus calculated is seven-dimensional information that is constituted by six-dimensional information for specifying the position and posture of the multi-fingered hand H, which corresponds to the distal end of the robot R, and one-dimensional information for defining the opening width between the fingers of the multi-fingered hand H. It is also possible to calculate a plurality of gripping position/postures as options for the gripping position/posture.

Then, the range image interpolation unit 24 interpolates the unmeasured areas UA using range data in order to perform determination of interference in the next step S36 (step S35).

Specifically, the range information of an unmeasured area UA, that is on a cross section including operation areas of the fingers of the multi-fingered hand H at the gripping position/posture calculated by the gripping position/posture recognition unit 22 in step S34, is interpolated using the closer one of two distances represented by the range data, on this cross section, at the boundaries between the unmeasured area UA and the measured areas.

Figure 5A:
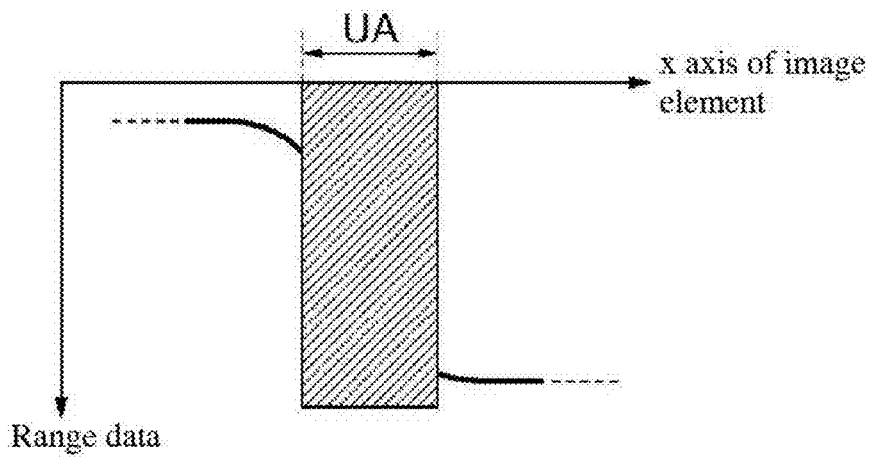
FIG. 5A, FIG. 5B and FIG. 5C are diagrams illustrating profiles of range data on a predetermined cross section.

FIG. 5A shows a profile of the range data on such a cross section. The horizontal axis indicates positions of one finger of the multi-fingered hand H in its operation direction in image element units, and an unmeasured area UA is included in the operation area of the finger of the multi-fingered hand H. Accordingly, the operation area includes two measured areas separated by the unmeasured area UA.

The vertical axis indicates range data. In the drawing, the measured area on the left side of the unmeasured area UA has a small distance (small value in range data). On the other hand, the measured area on the right side of the unmeasured area UA has a large distance (large value in range data). This indicates that a workpiece W is present in the area having a small distance.

Figure 5B:
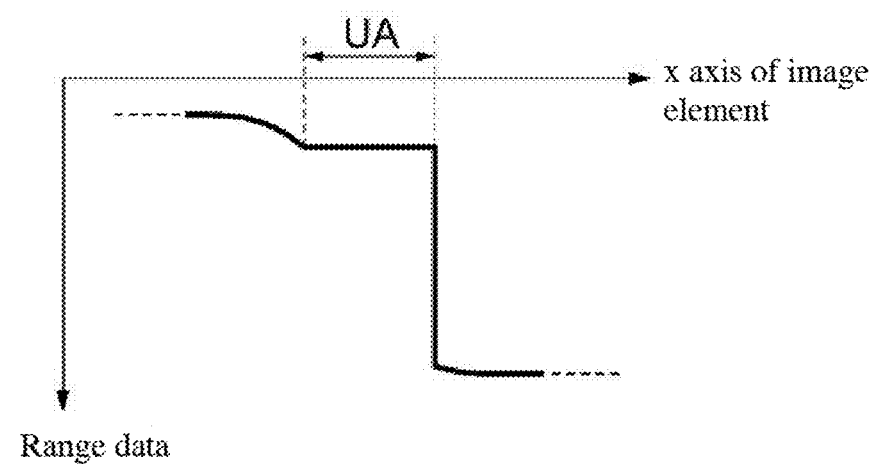

FIG. 5B shows a profile after the interpolation in step S35. It is shown that the unmeasured area UA on the cross section is interpolated using the closer one (smaller value in range data) of the two distances represented by the range data at a position (an example of a "first position") at which the left-side measured area is adjacent to the unmeasured area UA and the range data a position (an example of a "second position") at which the right-side measured area is adjacent to the unmeasured area UA. Because workpieces W often protrude from surrounding areas, the workpieces W have a closer distance (smaller value in range data) than the surrounding areas. Accordingly, as a result of such interpolation, it is possible to generate range image data DD in which an unmeasured area UA is dealt with as if it is an area in which a workpiece W is present.

Note that, if each finger of the multi-fingered hand H has a width that corresponds to a plurality of image elements, range data of the unmeasured area UA is interpolated with respect to profiles on a plurality of cross sections taken along the respective image elements. For example, if each of the fingers of the multi-fingered hand H has a width that corresponds to five image elements, range data of the unmeasured area UA is interpolated with respect to five cross sections.

Figure 5C:
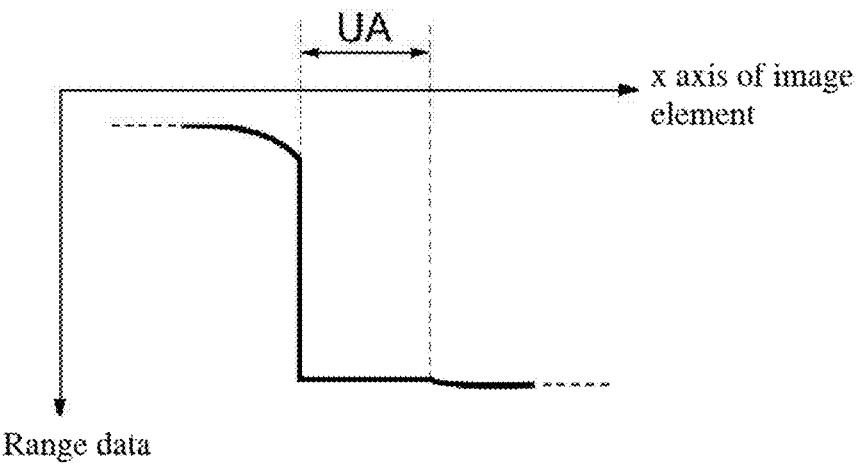

FIG. 5C shows, as a comparative example, a profile of a case where an unmeasured area UA is interpolated using the farther one (larger value in range data) of two distances represented by range data at the boundaries between the unmeasured area UA and the measured areas.

Then, the hand opening width update unit 26 updates the opening width (opening degree) of the multi-fingered hand H (an example of "distance between a plurality of fingers") based on the range image data DD in which the range data of the unmeasured areas UA is interpolated (step S36).

Figure 6:
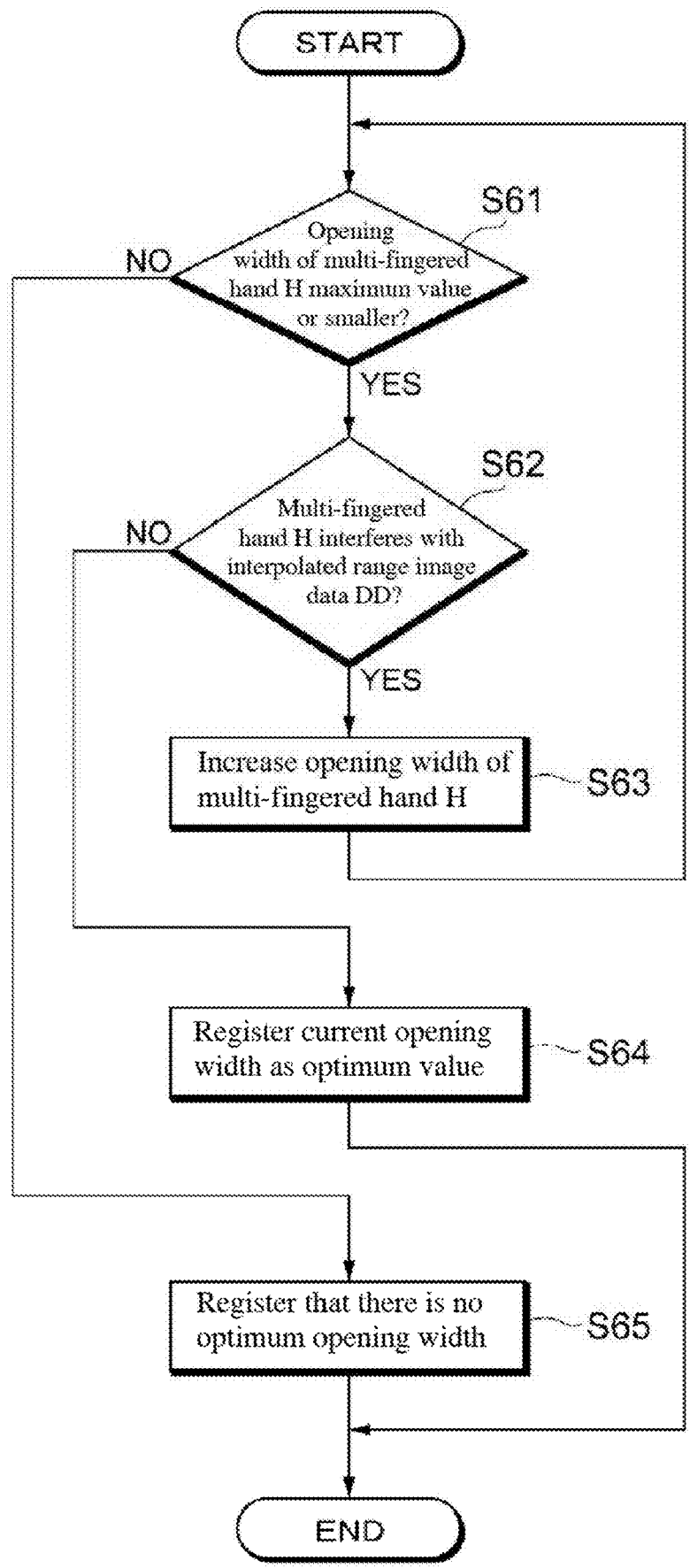
FIG. 6 is a flowchart illustrating sub steps of updating an opening width of a multi-fingered hand.

FIG. 6 is a flowchart of sub steps of step S36 of updating the opening width of the multi-fingered hand H by the hand opening width update unit 26.

First, it is determined whether or not the current opening width (an example of a "first distance") of the multi-fingered hand H set in step S34 is equal to or smaller than the maximum value of the maximum opening width that the multi-fingered hand H can have (sub step S61). If the opening width of the multi-fingered hand H has a value equal to or smaller than the maximum value of the opening width that the multi-fingered hand H can have (YES), the procedure advances to sub step S62.

It is determined whether or not the multi-fingered hand H having the current opening width interferes with the range image data DD in which the interpolation has been performed in step S35 (sub step S62). Specifically, the following procedure is executed.

First, finger areas, occupied by the fingers of the multi-fingered hand H, within an area defined by image coordinates constituting the image range image data DD are calculated.

Here, image coordinates (x, y) that are obtained when projecting a point specified by three-dimensional positional coordinates (X, Y, Z) onto the plane defined by the image coordinates constituting the range image data DD can be calculated by the following perspective projection formula.

$$x = f\frac{X}{Z} + c_x, \quad y = f\frac{Y}{Z} + c_y \qquad \text{[Formula 1]}$$

where f is a focal length of the three-dimensional measurement sensor 16, and Cx and Cy are image coordinates of the center of the three-dimensional measurement sensor 16.

Accordingly, by calculating the three-dimensional positional coordinates of the tips of the fingers of the multi-fingered hand H based on the gripping position/posture of the multi-fingered hand H calculated in step S34, and applying the formula above for each tip to calculate its position on the image coordinates, it is possible to calculate the area enclosed by the positions of the tips on the image coordinates, as the finger areas occupied by the fingers of the multi-fingered hand H.

Thus, interference of the multi-fingered hand H is determined using the calculated finger areas of the multi-fingered hand H and the interpolated range image data DD (sub step S62). For example, by determining whether or not, on the range image data DD, the finger areas of the multi-fingered hand H overlap an area that is likely to interfere with the multi-fingered hand H (for example, an area whose range data has a value equal to or smaller than a predetermined value), the likelihood of interference of the multi-fingered hand H is determined.

If it is determined that the multi-fingered hand H does not interfere (NO), the current opening width of the multi-fingered hand H is registered as an optimum value (an example of a "second distance") (sub step S64), and the subroutine is ended.

If it is determined that the multi-fingered hand H interferes (YES), the set value of the opening width of the multi-fingered hand H is increased by a predetermined amount (for example, by five image elements) in sub step S63, and sub step S61 is executed again.

If, in sub step S61, the current set value of the opening width of the multi-fingered hand H is equal to or smaller than the maximum value of the opening width that the multi-fingered hand H can have (YES), the procedure from sub steps S62 onwards is executed in a repeated manner.

On the other hand, if the current set value of the opening width of the multi-fingered hand H exceeds the maximum value of the opening width that the multi-fingered hand H can have (NO), it is registered that no optimum opening width is present (sub step S65), and the subroutine is ended.

Then, the position and posture of the multi-fingered hand H that were set in step S34 and the opening width of the multi-fingered hand H that was registered in sub step S64 are selected as optimum gripping position/posture for gripping the workpiece W (step S37). Here, if a plurality of options for the position/posture of the multi-fingered hand H were set in step S34, the most appropriate gripping position/posture is selected from among them. For example, the order of precedence is set among the plurality of gripping positions/posture using, as indicators, the distance from the three-dimensional measurement sensor 16 (the closer, the more preferable), the inclination of the multi-fingered hand H (the less inclination, the more preferable), the area of unmeasured areas UA in a region occupied by the multi-fingered hand H (the smaller, the more preferable), and the like, and the most appropriate one is selected from among them.

Then, the information processing unit 18 outputs information relating to the optimum gripping position/posture to the robot control unit 12 (step S38).

The robot control unit 12 outputs a control instruction to instruct the robot R and the multi-fingered hand H to take the input optimum gripping position/posture.

In accordance with the control instruction, the robot R and the multi-fingered hand H approach the workpiece W with the opening width of the multi-fingered hand H at the optimum gripping position/posture selected in step S37, and take the optimum gripping position/posture. Then, the robot R and the multi-fingered hand H reduce the distance between the fingers of the multi-fingered hand H based on the control instruction output from the robot control unit 12, and grip the workpiece W.

The following will describe effects of the gripping method according to one or more embodiments with reference to the drawings.

Figure 7A:
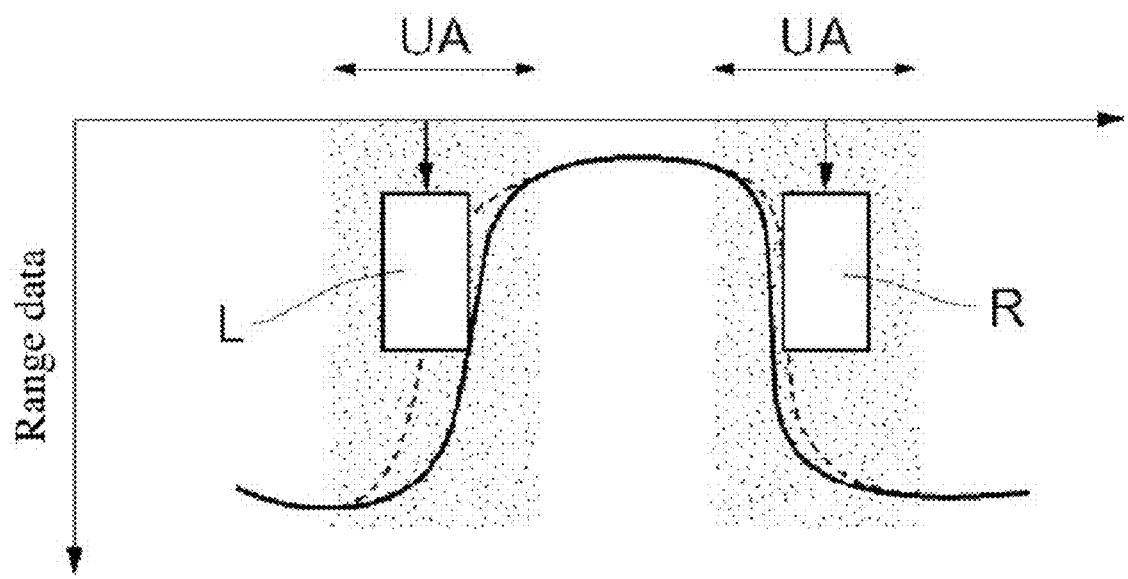
FIG. 7A and FIG. 7B are diagrams illustrating positional relationships between motion directions of fingers of a multi-fingered hand and a workpiece.
Figure 7B:
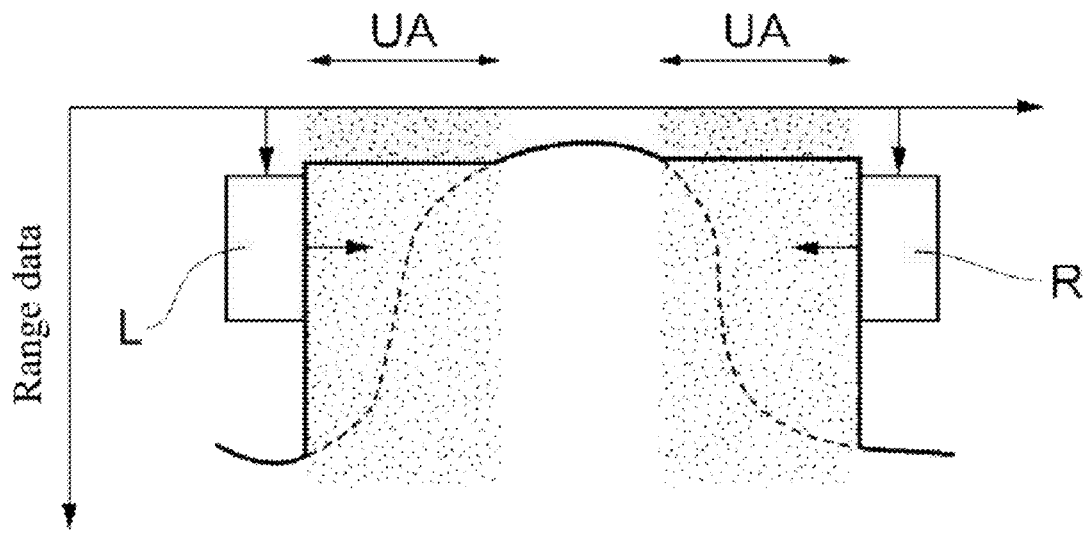

FIG. 7 shows, on a cross section including the operation areas of the fingers L and R of the multi-fingered hand H, the motion directions of the fingers L and R, and an actual cross section (dotted line) of the workpiece W and the cross section of the workpiece W in which the unmeasured areas UA are interpolated (solid line). FIG. 7A shows a gripping method of a comparative example, and FIG. 7B shows a gripping method according to one or more embodiments.

In the case of the comparative example, as a result of interpolating the unmeasured area UA, the width of the workpiece W is interpolated to be smaller than the actual width of the workpiece W. Accordingly, when the multi-fingered hand H advances toward the workpiece W, the finger L collides with the workpiece W. This may wreak enormous damage, such as the workpiece W being damaged, and the operation process being stopped.

In the case of one or more embodiments, after the gripping position/posture of the multi-fingered hand H when gripping the workpiece W has been decided, the entire ranges, along the axis in the direction in which the multi-fingered hand H is opened and closed, of the unmeasured areas UA are interpolated using the closer (smaller) one of adjacent distances represented by the range data, and the opening width of the multi-fingered hand H is set so that the multi-fingered hand H does not interfere with the workpiece W or the like even based on the interpolated range image data DD. Then, by advancing toward the workpiece W while keeping an opening width that is equal to or larger than this opening width at least in the vicinity of the workpiece W, and then reducing the distance between the fingers of the hand H, the multi-fingered hand H can grip the workpiece W without damaging it.

Note that the foregoing has described cases of outer diameter gripping, but in cases of inner diameter gripping, it is sufficient to modify sub step S61 so that it is determined whether or not the opening width of the multi-fingered hand H has a value equal to or smaller than the minimum value, and modify sub step S63 so that the opening width of the multi-fingered hand H is reduced.

Furthermore, after the determination in sub step S62 that the multi-fingered hand H does not interfere with the interpolated range image data DD (NO), it is also possible to search for a more accurate optimum opening width. For example, it is possible to search for the minimum opening width at which the multi-fingered hand H does not interfere with the interpolated range image data DD, by executing sub step S62 while reducing the multi-fingered hand H by an amount smaller than the amount of increase in the opening width defined in sub step S63.

Furthermore, it is also possible to originally set the amount of increase in the opening width in sub step S63 to a settable minimum value and to search for the minimum opening width at which the multi-fingered hand H does not interfere with the interpolated range image data DD.

Also, in one or more embodiments, the multi-fingered hand H has two fingers, and thus the opening width of the multi-fingered hand H, which is one dimensional information, is updated and an optimum distance between the fingers is set, but the present invention is not limited to this, and the gripping method according to one or more embodiments may also be applied to a multi-fingered hand H with fingers for each of which the position can be set. In this case, instead of updating the opening width, it is also possible to decide, for each finger, the position at which it does not interfere with the interpolated range image data DD. For example, in a case of a multi-fingered hand H with three fingers, the cross section including the operation areas for the fingers and the interpolated range image data DD on the cross section may be compared with each other, and the positions of fingers at which they do not interfere with the workpiece W may be set.

Furthermore, the multi-fingered hand H may be moved so that the opening width of the multi-fingered hand H registered as an optimum value is kept, at least in the vicinity of the workpiece W, as a value that is equal to or greater than the opening width in the case of outer gripping, or a value that is equal to or smaller than the opening width in the case of inner gripping.

Note that, depending on the situation in which a workpiece W is placed, an unmeasured area may occur in an area other than the edge of the workpiece W. The following will describe an example in which the gripping method according to one or more embodiments is applied to such a situation.

Figure 8A:
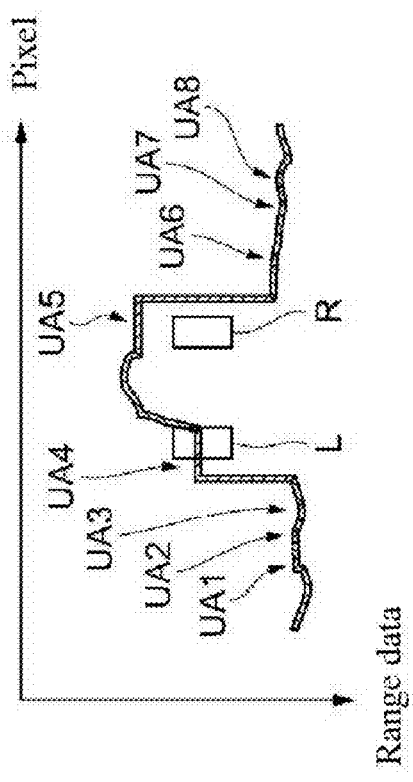
FIG. 8A to FIG. 8D are diagrams illustrating range image data that includes eight unmeasured areas.

FIG. 8A shows a case where eight unmeasured areas UA1 to UA8 are present in the range image data DD. Furthermore, a line segment V indicates a line segment that includes the operation areas of the fingers of the multi-fingered hand H.

Figure 8B:
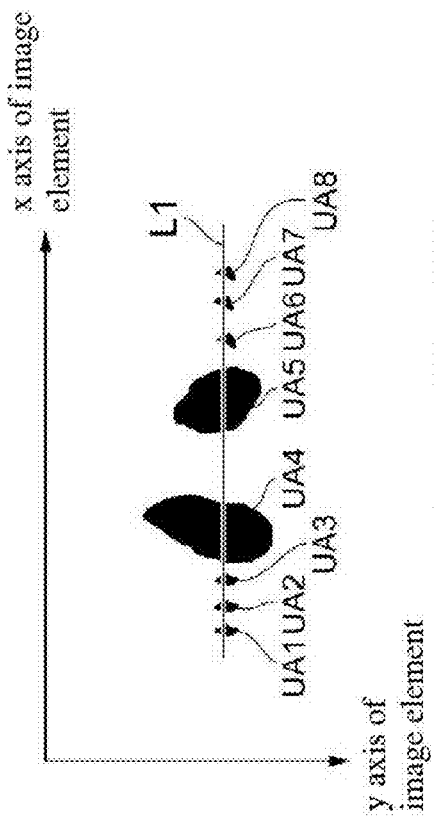

FIG. 8B shows a profile of the range data on the cross section including the operation areas of the fingers of the multi-fingered hand H. The vertical axis indicates the range data, and the value of the range data is larger, that is, the distance is larger, toward the bottom of the figure. Furthermore, the range data for the unmeasured areas UA1 to UA8 is unknown.

Figure 8C:
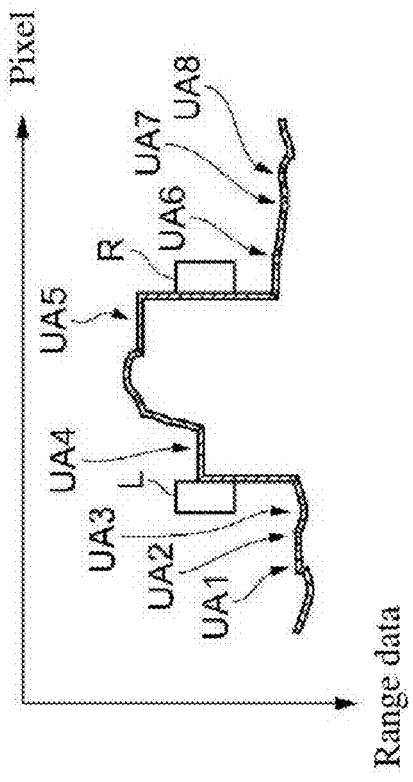

FIG. 8C shows a profile after the interpolation in step S35, and a case where the opening width at which interference of the left and right fingers L and R of the multi-fingered hand H occurs. As shown in the profile, each of the unmeasured areas UA1 to UA8 is interpolated using the closer (smaller) one of two distances represented by the range data at the boundaries to the measured area. On the other hand, the positions of the left and right fingers L and R of the multi-fingered hand H are known based on the gripping position/posture calculated in step S34, and thus it is possible to determine, in sub step S62, whether or not this opening width causes interference. Here, the unmeasured areas UA1 to UA3 and UA6 to UA8 are areas that hardly have a difference in range data between two ends, and have large distances (larger range data). Accordingly, they are unmeasured areas that do not interfere with the multi-fingered hand H when gripping. On the other hand, the unmeasured areas UA4 and UA5 are unmeasured areas that are likely to interfere because at least one of adjacent distances represented by the range data has a smaller value and thus is a closer distance, and thus it may be necessary to increase the opening width of the multi-fingered hand H so that the multi-fingered hand H is prevented from interfering with the multi-fingered hand H.

Figure 8D:
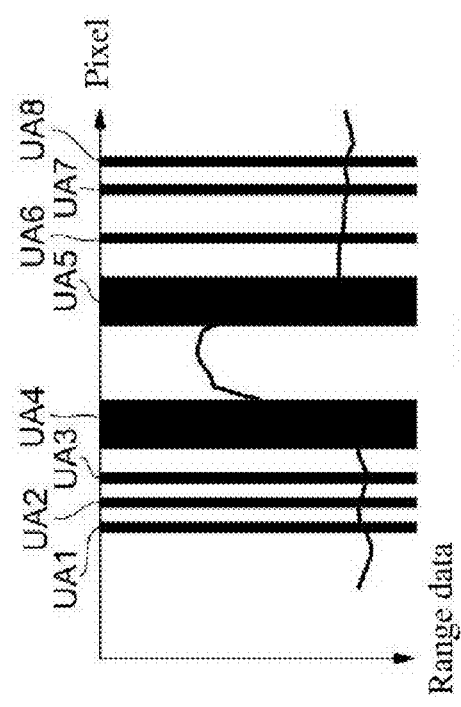

FIG. 8D shows the state in which the opening width of the multi-fingered hand H is increased until the multi-fingered hand H does not interfere with the interpolated range image data DD.

Accordingly, even if the interpolation method of the gripping method of one or more embodiments is used to interpolate the range data of unmeasured areas UA included in the operation areas of the fingers, uniformly, that is, without determining whether or not they are unmeasured areas UA present at the edge of a workpiece W, it is possible to decide the optimum opening width without damaging the workpiece W. On the other hand, a configuration is also possible in which only a given (for example, closer) unmeasured area UA is interpolated.

Furthermore, when setting the opening width, it is also possible to take into consideration the situation around the workpiece W. For example, if, in FIG. 8, at least one of the distances of the unmeasured area UA7 is smaller (has smaller range data), it is also possible to set the opening width so that the multi-fingered hand H does not interfere with it.

Furthermore, the determination of interference between the multi-fingered hand H and the interpolated range image data DD in sub step S62 may also be executed using another method. For example, the width of the workpiece W (including unmeasured areas UA) may be calculated based on the profile of the range data in the operation directions of the fingers of the multi-fingered hand H, and the calculated width may be compared with the current opening width of the multi-fingered hand H.

Furthermore, the interpolation of the range image data DD in step S35 does not necessarily use the range data in the operation direction of the multi-fingered hand H. For example, of a plurality of pieces of range data that correspond to a plurality of surrounding positions, the range data at the closest position may be used for the interpolation.

Third Embodiment

The following will describe a third embodiment. Note that descriptions of parts common to or similar to other embodiments are simplified, and the description will be given focusing mainly on differences therefrom.

In a second embodiment, the shape of the workpieces W is known, and thus the workpiece shape data WD can be used when, for example, the gripping position/posture is set. On the other hand, one or more embodiments will describe a gripping method that can be performed when the shape of workpieces W is unknown. Note however that the gripping method of one or more embodiments may also be applied to a workpiece W whose shape is known.

Figure 9:
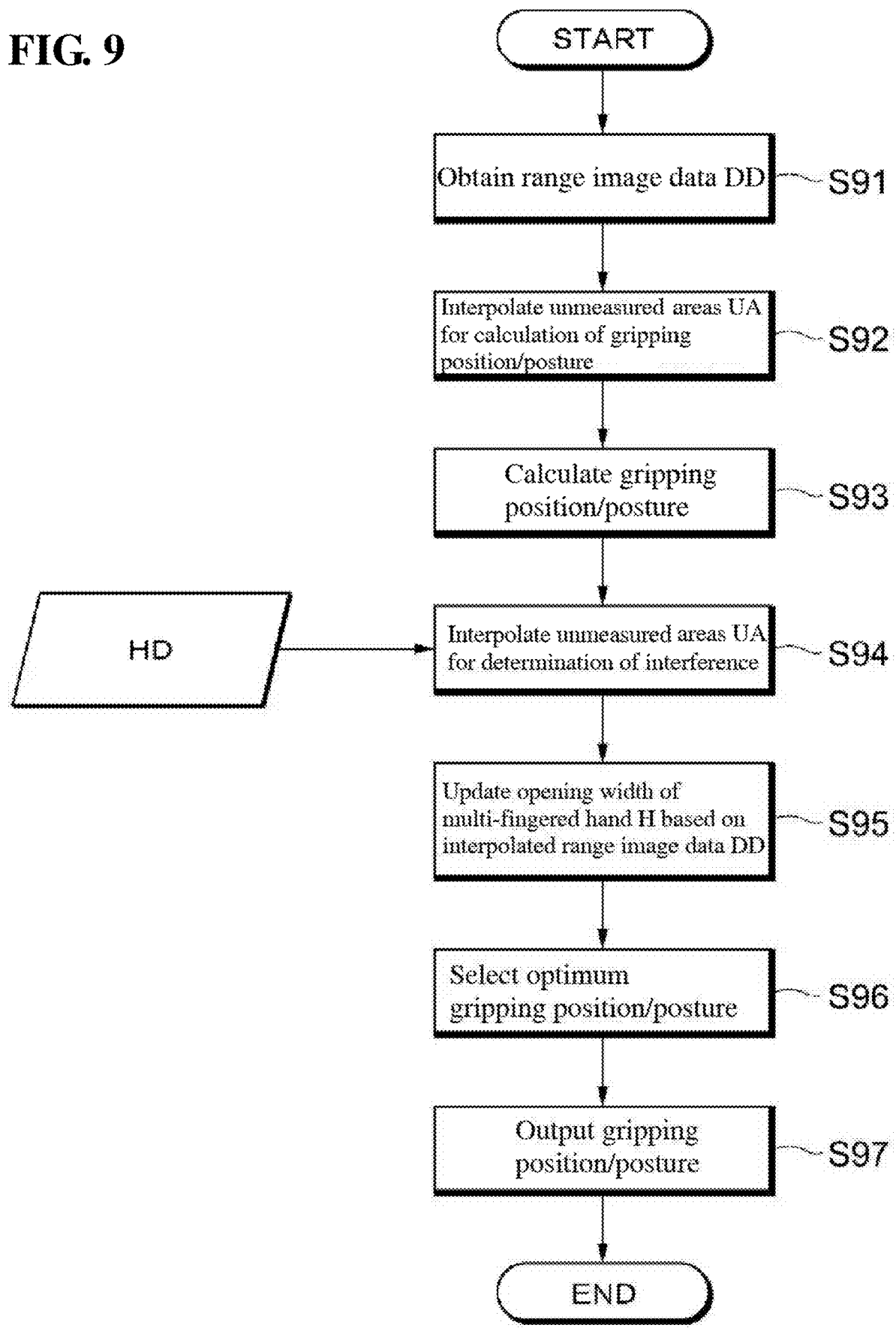
FIG. 9 is a flowchart illustrating a gripping method according to a third embodiment.

FIG. 9 is a flowchart of the gripping method according to one or more embodiments.

First, range image data DD is obtained using the three-dimensional measurement sensor 16 (step S91).

Then, range data of unmeasured areas UA of the obtained range image data DD is interpolated in order to calculate the gripping position/posture (step S92). Specifically, an unmeasured area UA is interpolated using the farther one (larger value in range data) of two distances represented by the range data at the boundaries between the unmeasured area UA and the measured area, based on the range data on a cross section including the operation areas of the fingers of the multi-fingered hand H. For example, with respect to a profile of a cross section as shown in FIG. 5A, the range data is interpolated as shown in FIG. 5C.

Then, the gripping position/posture of the multi-fingered hand H is calculated (step S93). The gripping position/posture recognition unit 22 obtains the edge shape of the workpiece W based on the range image data DD in which the range data of the unmeasured areas UA was interpolated in step S92. Furthermore, the gripping position/posture recognition unit 22 reads out the hand shape data HD from the storage medium 20 to calculate the gripping position/posture of the multi-fingered hand H for gripping the workpiece W. Here, the calculated gripping position/posture is seven-dimensional information that is constituted by six-dimensional information for specifying the position and posture of the multi-fingered hand H, which corresponds to the distal end of the robot R, and one-dimensional information for defining the opening width between the fingers of the multi-fingered hand H. It is also possible to calculate a plurality of gripping positions/postures.

Subsequent steps S94 to S97 are the same as steps S35 to S38 in FIG. 3 (and sub steps shown in FIG. 6), and thus descriptions thereof are omitted. Through these steps, it is possible to decide the optimum gripping position/posture for gripping the workpiece W.

In such a gripping method, in step S92, first, range data is interpolated based on the range image data DD that contains the unmeasured area UA so that the distance of the unmeasured area UA is large (the value in range data is large) (FIG. 5C), and one or more gripping position/postures at which a workpiece W can be gripped are calculated (step S93), and then based on the same range image data DD that contains the unmeasured area UA, the range data is interpolated so that the distance between the three-dimensional measurement sensor 16 and the unmeasured area UA is small (the value of the range data is small) (see step S94 and FIG. 5B), and the opening width of the multi-fingered hand H is decided (step S95).

The following will describe effects realized by using range image data DD that is interpolated by different interpolation methods depending on the purpose, with reference to the drawings.

Figure 10A:
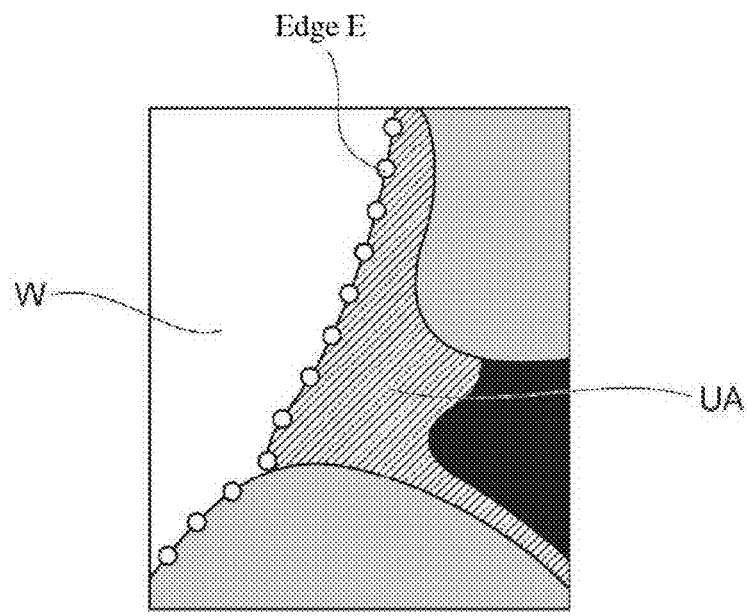
FIG. 10A and FIG. 10B are comparison diagrams between interpolation methods.
Figure 10B:
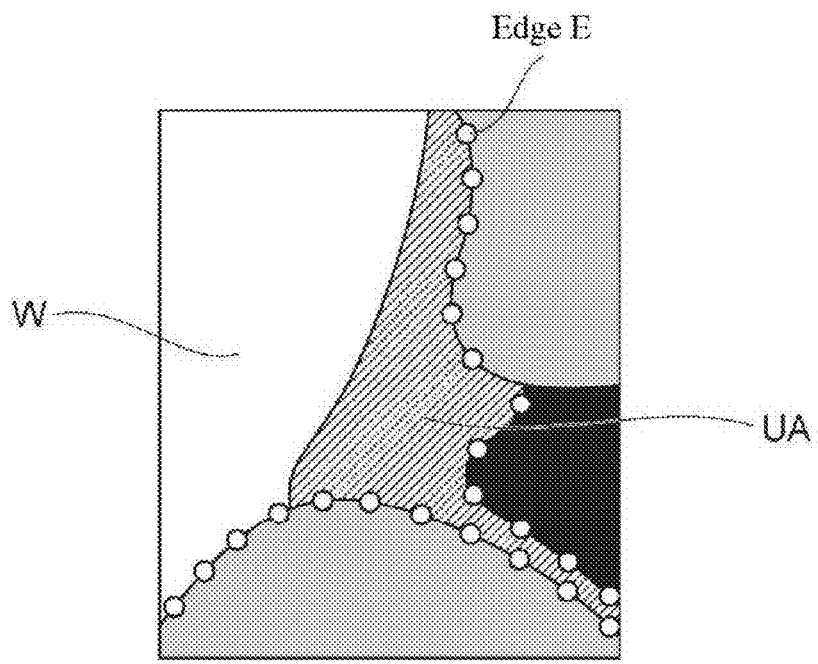

FIG. 10 shows edges E that can be extracted when the interpolation method according to one or more embodiments is applied to an area AR shown in FIG. 4. FIG. 10A shows edges E that can be extracted through the interpolation performed in step S92, and FIG. 10B shows edges E that can be extracted through the interpolation performed in step S94. The distance between the three-dimensional measurement sensor 16 and the workpiece W is typically smaller than the distance between the three-dimensional measurement sensor 16 and the plane on which the workpiece W is placed. Accordingly, an unmeasured area UA is likely to be formed between the surface of the workpiece W (an area that has the closer distance or the smaller value in range data) and the plane on which the workpiece W is placed (an area that has the farther distance or the larger value in range data).

Also, on the surface of the workpiece W, a curve that has a constant distance between the three-dimensional measurement sensor 16 and the workpiece W is typically smooth, and thus the boundary between the measured area of the workpiece W and the unmeasured area UA is likely to be smooth.

Accordingly, as shown in FIG. 10A, the interpolation is performed so that the boundary between the measured area of the workpiece W and the unmeasured area UA is recognized as the edges E, and the edges E can be used when extracting the positions at which the workpiece W can be gripped by the multi-fingered hand H.

On the other hand, when determining the likelihood of interference, it is preferable to set the opening width of the multi-fingered hand H assuming that the unmeasured area UA adjacent to the workpiece W is an area that has the closer distance (smaller amount of data) as with the workpiece W, in order to prevent the risk of interference. Accordingly, as shown in FIG. 10B, by performing the interpolation such that the boundaries between the unmeasured area UA and the measured areas to which the workpiece W is not adjacent are recognized as the edges E, it is possible to select the opening width of the multi-fingered hand H that can prevent interference.

As described above, in order to set the gripping position/posture of the multi-fingered hand H for gripping a workpiece W, the range image data DD is first interpolated so that the boundary between the workpiece W and the unmeasured area is recognized as edges. Accordingly, the edges E for which the range data changes significantly are easier detected than in the case where the range data of the unmeasured area is interpolated so as to continuously change from the workpiece W to the plane on which the workpiece W is placed. Accordingly, it is possible to recognize the shape of the workpiece W, and specify one or more positions at which the multi-fingered hand H can grip the workpiece W. Note however that an embodiment is not limited to this, and one or more positions at which the workpiece W can be gripped may be specified using another method.

On the other hand, when deciding the opening width of the fingers of the multi-fingered hand H, it is possible to interpolate the unmeasured area UA using the same range data as that of the workpiece W so as to suppress the likelihood of interference between the workpiece W and the fingers of the multi-fingered hand H.

In this way, if the range image data DD includes an unmeasured area UA, range image data DD is generated based on the two types of interpolation (including range image data DD based on the interpolation that is performed so that the area that contains the workpiece W and has the same range data as the workpiece W is large, and range image data DD based on the interpolation that is performed so that the area that contains the workpiece W and has the same range data as the workpiece W is small), and the generated range image data DD is used depending on the usage. Thus, it is possible to realize a more appropriate method for gripping a workpiece.

Note that, in the present specification, "unit" and "means", and "procedure" do not simply mean physical configurations, and may include a case in which the processing executed by the "unit" and the like is realized by software. Furthermore, processing that is performed by a single "unit" etc. or apparatus may be executed by two or more physical configurations or apparatus, or processing that is performed by two or more "unit" etc. or apparatus may be executed by a single physical means or apparatus.

The above-described embodiments are examples for explaining the present invention, and are not intended to restrict the present invention only to the embodiments.

Furthermore, the present invention can be modified without departing from the essence thereof. For example, it is also possible to combine some of the constituent components in an embodiment with constituent components in another embodiment, within the scope of ordinary creativity of a person skilled in the art.

Furthermore, the order of steps shown in the flowcharts may also be changed within the scope of ordinary creativity of a person skilled in the art. For example, step S92 and step S94 may be executed at the same time.

At least one or all of the above-described embodiments can be described as, but are not limited to, the following appendixes.

APPENDIX 1

A gripping method for gripping an object W using a multi-fingered hand H provided with a plurality of fingers, comprising:

a range information obtaining step of obtaining, using a three-dimensional measurement sensor 16, three-dimensional information that includes range information for a predetermined area that contains the object W;

an interpolating step of classifying, if the predetermined area includes an area for which the three-dimensional information cannot be obtained, the predetermined area into a measured area and at least one unmeasured area UA based on the three-dimensional information, and interpolating the at least one unmeasured area UA using the range information indicating the closer one of distances obtained at two positions on an axis extending along a direction in which the fingers are opened and closed, the two positions being adjacent to the unmeasured area UA with the unmeasured area UA interposed therebetween;

a distance deciding step of deciding a distance between the plurality of fingers based on the range information obtained in the range information obtaining step and the range information obtained through the interpolation in the interpolating step; and a step of controlling the multi-fingered hand H to grip the object W with the decided distance between the fingers.

APPENDIX 2

A gripping system 10 comprising:

a multi-fingered hand H provided with a plurality of fingers for gripping an object W;

a robot arm to which the multi-fingered hand H is connected;

a three-dimensional measurement sensor 16 configured to obtain three-dimensional information that includes range information for a predetermined area that contains the object W; and a controller 18 configured to classify, if the predetermined area includes an area for which the three-dimensional information cannot be obtained, the predetermined area into a measured area and at least one unmeasured area UA based on the three-dimensional information, and interpolate the at least one unmeasured area UA using the range information indicating the closer one of distances obtained at two positions on an axis extending along a direction in which the fingers are opened and closed, the two positions being adjacent to the unmeasured area UA with the unmeasured area UA interposed therebetween, the controller 18 being configured to decide a distance between the plurality of fingers based on the range information obtained by the three-dimensional measurement sensor 16 and the interpolated range information, and the controller 18 being configured to control the multi-fingered hand H to grip the object W with the decided distance between the fingers.

APPENDIX 3

A program for gripping an object W using a multi-fingered hand H provided with a plurality of fingers, the program causing a computer to execute:

a range information obtaining step of obtaining, using a three-dimensional measurement sensor 16, three-dimensional information that includes range information for a predetermined area that contains the object W;

an interpolating step of classifying, if the predetermined area includes an area for which the three-dimensional information cannot be obtained, the predetermined area into a measured area and at least one unmeasured area UA based on the three-dimensional information, and interpolating the at least one unmeasured area UA using the range information indicating the closer one of distances obtained at two positions on an axis extending along a direction in which the fingers are opened and closed, the two positions being adjacent to the unmeasured area UA with the unmeasured area UA interposed therebetween, a distance deciding step of deciding a distance between the plurality of fingers based on the range information obtained in the range information obtaining step and the range information obtained through the interpolation in the interpolating step; and a step of controlling the multi-fingered hand H to grip the object W with the decided distance between the fingers.

The invention claimed is:

1. A gripping method for gripping an object using a multi-fingered hand provided with a plurality of fingers, comprising:

obtaining, using a three-dimensional measurement sensor, three-dimensional information comprising range information for a predetermined area that contains the object, the range information comprising distances from the three-dimensional sensor;

in response to the predetermined area including an area for which the three-dimensional information cannot be obtained, classifying the predetermined area into a measured area and at least one unmeasured area based on the three-dimensional information, and interpolating the at least one unmeasured area using a smaller one of distances obtained from the range information at two positions on a horizontal axis extending along a direction in which the fingers are opened and closed, the two positions being adjacent to the at least one unmeasured area with the at least one unmeasured area interposed therebetween;

deciding a distance between the plurality of fingers based on the range information included in the obtained three-dimensional information and range information obtained through the interpolation of the at least one unmeasured area; and controlling the multi-fingered hand to grip the object with the decided distance between the fingers.

2. The gripping method according to claim 1, wherein a distance between the fingers at which the fingers do not interfere with the object is decided as the distance between the plurality of fingers based on the range information included in the obtained three-dimensional information and the range information obtained through the interpolation of the at least one unmeasured area.

3. The gripping method according to claim 1, further comprising:
interpolating the at least one unmeasured area using a farther one of the distances obtained at the two positions on the horizontal axis extending along the direction in which the fingers are opened and closed adjacent to the at least one unmeasured area; and
deciding positions of the plurality of fingers when the plurality of fingers grips the object, based on the range information included in the obtained three-dimensional information and range information obtained through the interpolation of the at least one unmeasured area using the range information indicating the farther one of the distances obtained at the two positions on the horizontal axis extending along the direction in which the fingers are opened and closed.

4. The gripping method according to claim 3, wherein
the positions of the plurality of fingers when the plurality of fingers grips the object are decided based on data indicating a shape of the object, data indicating a shape of the plurality of fingers, and data indicating positions at which the object can be gripped.

5. The gripping method according to claim 3, wherein
in response to an operation area of the fingers that includes the decided positions of the fingers containing one unmeasured area and two measured areas separated by the unmeasured area, the unmeasured area is interpolated using a smaller one of distances, obtained from the range information, from among a first position in the operation area, at which one of the measured areas is adjacent to the unmeasured area, and at a second position in the operation area, at which the other one of the measured areas is adjacent to the unmeasured area.

6. The gripping method according to claim 3, further comprising:
advancing the multi-fingered hand toward the object while keeping the decided distance between the plurality of fingers; and
gripping the object by moving the plurality of fingers to the decided positions of the plurality of fingers while changing the distance between the plurality of fingers.

7. The gripping method according to claim 6, wherein
gripping the object comprises moving the plurality of fingers so that the distance between the plurality of fingers is reduced.

8. The gripping method according to claim 6, wherein
gripping the object comprises contacting the object with any one of the plurality of fingers after having moved from the measured area to the at least one unmeasured area.

9. The gripping method according to claim 1, wherein
deciding the distance between the plurality of fingers comprises:
determining whether any of the plurality of fingers interfere with the object in response to the distance between the plurality of fingers being a first distance, based on the range information included in the obtained three-dimensional information and the range information obtained through the interpolation of the at least one unmeasured area; and
searching for, in response to determining that any of the plurality of fingers interfere with the object, a second distance at which the plurality of fingers do not interfere with the object, the second distance serving as the distance between the plurality of fingers.

10. A gripping system comprising:
a multi-fingered hand provided with a plurality of fingers for gripping an object;
a robot arm to which the multi-fingered hand is connected;
a three-dimensional measurement sensor configured to obtain three-dimensional information comprising range information for a predetermined area that contains the object, the range information comprising distances from the three-dimensional measurement sensor; and
a controller comprising a processor configured with a program to perform operations comprising:
in response to the predetermined area including an area for which the three-dimensional information cannot be obtained, classifying the predetermined area into a measured area and at least one unmeasured area based on the three-dimensional information, and interpolating the at least one unmeasured area using a smaller one of distances obtained from the range information at two positions on a horizontal axis extending along a direction in which the fingers are opened and closed, the two positions being adjacent to the at least one unmeasured area with the at least one unmeasured area interposed therebetween,
deciding a distance between the plurality of fingers based on the range information included in the obtained three-dimensional information and range information obtained through the interpolation of the at least one unmeasured area, and
controlling the multi-fingered hand to grip the object with the decided distance between the fingers.

11. A non-transitory computer-readable storage medium storing a program for gripping an object using a multi-fingered hand provided with a plurality of fingers, the program causing a computer to perform operations comprising:
obtaining, using a three-dimensional measurement sensor, three-dimensional information comprising range information for a predetermined area that contains the object, the range information comprising distances from the three-dimensional measurement sensor;
in response to the predetermined area including an area for which the three-dimensional information cannot be obtained, classifying the predetermined area into a measured area and at least one unmeasured area based on the three-dimensional information, and interpolating the at least one unmeasured area using a smaller one of distances obtained from range information at two positions on a horizontal axis extending along a direction in which the fingers are opened and closed, the two positions being adjacent to the at least one unmeasured area with the at least one unmeasured area interposed therebetween;
deciding a distance between the plurality of fingers based on the range information included in the obtained three-dimensional information and range information obtained through the interpolation of the at least one unmeasured area; and
controlling the multi-fingered hand to grip the object with the decided distance between the fingers.

12. The gripping system according to claim 10, wherein
the processor is configured with the program such that a distance between the fingers at which the fingers do not interfere with the object is decided as the distance between the plurality of fingers based on the range information included in the obtained three-dimensional information and the range information obtained through the interpolation of the at least one unmeasured area.

13. The gripping system according to claim 10, wherein the processor is configured with the program to perform operations further comprising:
interpolating the at least one unmeasured area using a farther one of the distances obtained at the two positions on the horizontal axis extending along the direction in which the fingers are opened and closed adjacent to the at least one unmeasured area; and
deciding positions of the plurality of fingers when the plurality of fingers grips the object, based on the range information included in the obtained three-dimensional information and range information obtained through the interpolation of the at least one unmeasured area using range information indicating the farther one of the distances obtained at the two positions on the horizontal axis extending along the direction in which the fingers are opened and closed.

14. The gripping system according to claim 13, wherein the processor is configured with the program such that the positions of the plurality of fingers when the plurality of fingers grips the object are decided based on data indicating a shape of the object, data indicating a shape of the plurality of fingers, and data indicating positions at which the object can be gripped.

15. The gripping system according to claim 13, wherein the processor is configured with the program such that in response to an operation area of the fingers that includes the decided positions of the fingers containing one unmeasured area and two measured areas separated by the unmeasured area, the unmeasured area is interpolated using a smaller one of distances, obtained from the range information, from among a first position in the operation area, at which one of the measured areas is adjacent to the unmeasured area, and at a second position in the operation area, at which the other one of the measured areas is adjacent to the unmeasured area.

16. The gripping system according to claim 13, wherein the processor is configured with the program to perform operations further comprising:
advancing the multi-fingered hand toward the object while keeping the decided distance between the plurality of fingers; and
gripping the object by moving the plurality of fingers to the decided positions of the plurality of fingers while changing the distance between the plurality of fingers.

17. The gripping system according to claim 16, wherein the processor is configured with the program such that the plurality of fingers are moved so that the distance between the plurality of fingers is reduced.

18. The gripping system according to claim 16, wherein the processor is configured with the program such that any one of the plurality of fingers contacts the object after having moved from the measured area to the unmeasured area.

19. The gripping system according to claim 10, wherein the processor is configured with the program such that deciding the distance between the plurality of fingers comprises:
determining whether any of the plurality of fingers interfere with the object in response to the distance between the plurality of fingers being a first distance, based on the range information included in the obtained three-dimensional information and the range information obtained through the interpolation of the at least one unmeasured area; and
searching for, in response to determining that any one of the plurality of fingers interfere with the object, a second distance at which the plurality of fingers do not interfere with the object, the second distance serving as the distance between the plurality of fingers.

* * * * *